(12) United States Patent
Kawahara et al.

(10) Patent No.: US 9,576,192 B2
(45) Date of Patent: Feb. 21, 2017

(54) METHOD AND APPARATUS FOR NOTIFYING MOTION

(71) Applicant: Yamaha Corporation, Hamamatsu-shi, Shizuoka (JP)

(72) Inventors: Takehiko Kawahara, Hamamatsu (JP); Morito Morishima, Fukuroi (JP)

(73) Assignee: Yamaha Corporation, Hamamatsu-shi (JP)

( * ) Notice: Subject to any disclaimer, the term of this patent is extended or adjusted under 35 U.S.C. 154(b) by 154 days.

(21) Appl. No.: 14/644,313

(22) Filed: Mar. 11, 2015

(65) Prior Publication Data

US 2015/0262612 A1    Sep. 17, 2015

(30) Foreign Application Priority Data

Mar. 12, 2014  (JP) .................. 2014-048602
Mar. 12, 2014  (JP) .................. 2014-048603

(51) Int. Cl.

| | |
|---|---|
| *H04N 9/80* | (2006.01) |
| *G06K 9/00* | (2006.01) |
| *H04N 21/2389* | (2011.01) |
| *H04N 21/258* | (2011.01) |
| *H04N 21/422* | (2011.01) |
| *H04N 21/43* | (2011.01) |
| *H04N 21/8358* | (2011.01) |
| *H04N 21/8547* | (2011.01) |
| *A63F 13/814* | (2014.01) |

(52) U.S. Cl.
CPC ......... *G06K 9/00342* (2013.01); *A63F 13/814* (2014.09); *H04N 21/23892* (2013.01); *H04N 21/25883* (2013.01); *H04N 21/42201* (2013.01); *H04N 21/4307* (2013.01); *H04N 21/8358* (2013.01); *H04N 21/8547* (2013.01)

(58) Field of Classification Search
CPC .............. A63F 13/814; G06K 9/00342; H04N 21/23892; H04N 21/42201; H04N 21/8358; H04N 21/8547
USPC ................... 386/260, 224, 225, 226, 228
See application file for complete search history.

(56) References Cited

U.S. PATENT DOCUMENTS

| | | | |
|---|---|---|---|
| 6,369,794 B1 * | 4/2002 | Sakurai | G06F 3/017 345/156 |
| 7,184,020 B2 * | 2/2007 | Matsui | G06F 1/1626 345/156 |
| 7,405,766 B1 * | 7/2008 | Chou | H04N 5/144 348/448 |
| 7,753,861 B1 * | 7/2010 | Kahn | A61B 5/1118 482/8 |

(Continued)

FOREIGN PATENT DOCUMENTS

| | | |
|---|---|---|
| JP | 2001-178965 A | 7/2001 |
| JP | 2011-37350 A | 2/2011 |

*Primary Examiner* — Helen Shibru
(74) *Attorney, Agent, or Firm* — Crowell & Moring LLP (57) ABSTRACT

A method for notifying a motion includes decoding watermark information superimposed on sound or video, outputting timing information obtained as a decoding result, analyzing a motion of a user with reference to a table, determining whether or not a predetermined timing comes based on the timing information, performing determination regarding the motion of the user based on an analysis result if it is determined that the predetermined timing comes, and performing notification based on a result of the determination.

15 Claims, 9 Drawing Sheets

(56) References Cited

U.S. PATENT DOCUMENTS

| | | | |
|---|---|---|---|
| 2007/0211799 A1* | 9/2007 | Henocq | H04N 7/68 375/240.16 |
| 2007/0237416 A1* | 10/2007 | Taguchi | G06T 3/4007 382/254 |
| 2010/0274639 A1* | 10/2010 | Tsuji | G06Q 10/06 705/7.38 |
| 2013/0014139 A1* | 1/2013 | Kawakami | A63J 5/021 725/9 |
| 2013/0101264 A1* | 4/2013 | Vermeulen | H04M 1/72522 386/225 |
| 2013/0135315 A1* | 5/2013 | Bares | G06T 13/20 345/473 |
| 2013/0307774 A1* | 11/2013 | Hayashi | G06F 3/017 345/158 |
| 2016/0271449 A1* | 9/2016 | Li | A63B 24/0062 |

* cited by examiner

| MOTION ID | HOST DEVICE | FIRST SLAVE DEVICE | SECOND SLAVE DEVICE | THIRD SLAVE DEVICE |
|---|---|---|---|---|
| ID1 | LEFT LATERAL MOVEMENT | RIGHT LATERAL MOVEMENT | NO MOVEMENT | NO MOVEMENT |
| ID2 | RIGHT LATERAL MOVEMENT | LEFT LATERAL MOVEMENT | NO MOVEMENT | NO MOVEMENT |
| ID3 | NO MOVEMENT | NO MOVEMENT | LEFT LATERAL MOVEMENT | RIGHT LATERAL MOVEMENT |
| ID4 | NO MOVEMENT | NO MOVEMENT | RIGHT LATERAL MOVEMENT | LEFT LATERAL MOVEMENT |
| ID5 | ROTATION+ID1 | ROTATION+ID1 | NO MOVEMENT | NO MOVEMENT |
| ID6 | ROTATION+ID2 | ROTATION+ID2 | NO MOVEMENT | NO MOVEMENT |
| ID7 | NO MOVEMENT | NO MOVEMENT | ROTATION+ID3 | ROTATION+ID3 |
| ID8 | NO MOVEMENT | NO MOVEMENT | ROTATION+ID4 | ROTATION+ID4 |
| ID9 | UPWARD MOVEMENT | UPWARD MOVEMENT | NO MOVEMENT | NO MOVEMENT |
| ID10 | DOWNWARD MOVEMENT | DOWNWARD MOVEMENT | NO MOVEMENT | NO MOVEMENT |
| ⋮ | ⋮ | ⋮ | ⋮ | ⋮ |
| IDn | ... | ... | ... | ... |

FIG. 4

| ITEMS | CONTENT |
|---|---|
| GENDER | MALE |
| AGE | IN HIS TWENTIES |
| HEIGHT | 180 cm |
| WEIGHT | 60 kg |
| ⋮ | ⋮ |

METHOD AND APPARATUS FOR NOTIFYING MOTION

CROSS REFERENCE TO RELATED APPLICATIONS

This application is based upon and claims the benefit of priority from the prior Japanese Patent Application No. 2014-048602 and 2014-048603 filed on Mar. 12, 2014, the entire contents of which are incorporated herein by reference.

BACKGROUND OF THE INVENTION

1. Field of the Invention

The present invention relates to a technique for determining a content of a motion or a timing of the motion and performing notification according to a result of the determination.

2. Description of the Related Art

In a fitness-based game or a dance-based game, a system is developed in which if a user moves in connection with a screen of the game, feedback is applied by detecting a movement of the user and an image such as "OK" is notified from the screen together with a sound or voice. In such a system, a camera as a sensor is provided and the motion of the user is image-analyzed by the camera or a sensor is provided on a dedicated stand and the like, and the motion of the user is analyzed by turning on and off of the sensor (for example, JP-A-2001-178965).

SUMMARY OF THE INVENTION

In a system of JP-A-2001-178965, a dedicated game apparatus is required and notification to the user is not possible using a general video DVD player or a video monitor.

Furthermore, in the system of the related art, since comparison of the motion of the user with a model motion is individually performed for each model motion, for example, a general purpose use such as diverting a video for training the upper body to a video for training the lower body cannot be provided.

The present invention is made in view of the circumstances described above and shows a non-limited example for solving the problem to provide a technique capable of performing notification to a user even when using a player such as a general video DVD player or a video monitor.

A first aspect of the present invention provides a method for notifying a motion including: decoding watermark information superimposed on sound or video; outputting timing information obtained as a decoding result; analyzing a motion of a user with reference to a table; determining whether or not a predetermined timing comes based on the timing information; performing determination regarding the motion of the user based on an analysis result if it is determined that the predetermined timing comes; and performing notification based on a result of the determination.

A second aspect of the present invention provides an apparatus for notifying a motion including a processor configured to: decode watermark information superimposed on sound or video; output timing information obtained as a decoding result; analyze a motion of a user with reference to a table; determine whether or not a predetermined timing comes based on the timing information; perform determination regarding the motion of the user based on an analysis result if it is determined that the predetermined timing comes; and perform notification based on a result of the determination.

According to the first and second aspects of the present invention, watermark information is superimposed on a video/audio medium and even if a player of the video/audio medium or a video monitor is used, it is possible to notify a user of information regarding a motion that is a reference to the user. For example, it is possible to notify the user of information regarding the reference motion which is difficult to understand only by watching the video/audio medium by vibration and the like by employing the vibration and the like as a notifying way. Furthermore, if a sensor and the like are included in the system, it is possible to notify the user of a result of a comparison determination of the motion by the user compared to the reference motion by the vibration and the like.

A third aspect of the present invention provides a method for notifying a motion including: analyzing a motion of a user with reference to a table, wherein the table associates motion information of one or more portions constituting a motion to be executed at a certain timing with identification information identifying the motion to be executed; referring to timing information indicating a timing of a reference motion and determining whether or not the timing comes; performing determination regarding the motion of the user based on the reference information specifying content of the reference motion and an analysis result if it is determined that the timing comes; and performing notification based on a result of the determination.

A fourth aspect of the present invention provides an apparatus for notifying a motion including: a table that associates motion information of one or more portions constituting a motion to be executed at a certain timing with identification information identifying the motion to be executed; and a processor configured to: analyze a motion of a user with reference to the table; refer to timing information indicating a timing of a reference motion and determine whether or not the timing comes; perform determination regarding the motion of the user based on reference information specifying content of the reference motion and an analysis result if it is determined that the timing comes; and perform notification based on a result of the determination.

According to the third and fourth aspect of the present invention, even if the player of the video/audio medium or the video monitor is used, it is possible to notify the user of information regarding a relationship between the reference motion and an actual motion of the user. For example, it is possible to notify the user of information regarding the relationship between the reference motion and the actual motion of the user, which is difficult to understand only by watching the video/audio medium by vibration and the like by employing the vibration and the like as notifying means.

DETAILED DESCRIPTION OF THE EXEMPLARY EMBODIMENTS

First Embodiment

Figure 1:
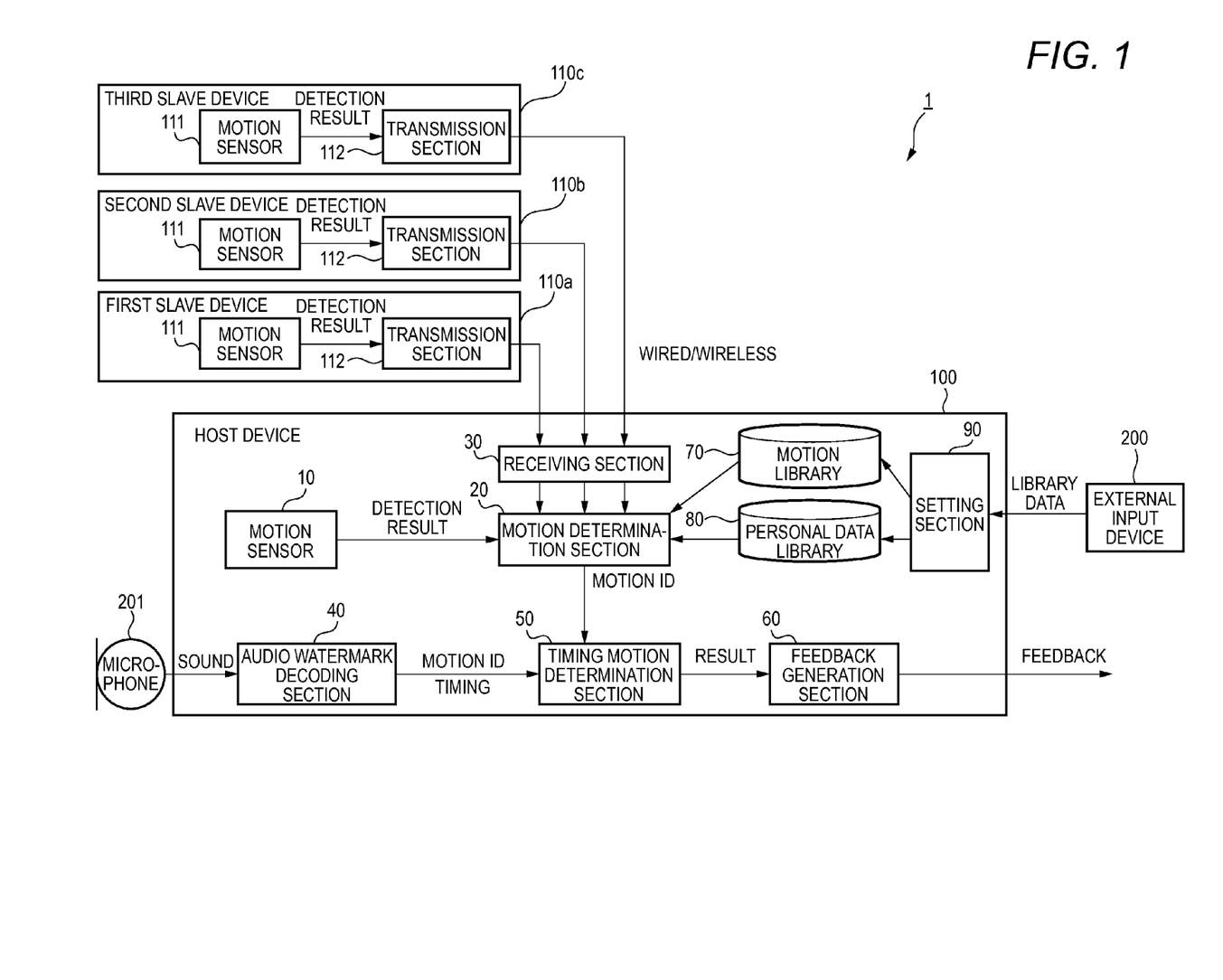
FIG. 1 is a block diagram illustrating a motion notification system according to a first embodiment of the present invention.

Hereinafter, a first embodiment of the present invention will be described with reference to the accompanying drawings. FIG. 1 is a block diagram illustrating a motion notification system 1 of a first embodiment. Generally, as an example, the motion notification system 1 includes one host device 100 and three slave devices of a first slave device 110a, a second slave device 110b, and a third slave device 110c. Moreover, the motion notification system 1 is not limited to such a configuration, but may include only one host device 100, and the number of slave devices may be arbitrarily set. In the embodiment, for example, the host device 100 is mounted on the right hand of a user, the first slave device 110a is mounted on the left hand of the user, the second slave device 110b is mounted on the right foot of the user, and the third slave device 110c is mounted on the left foot of the user.

The host device 100 includes a motion sensor 10, a motion determination section 20, a receiving section 30, an audio watermark decoding section 40, a timing motion determination section 50, a feedback generation section 60, a motion library 70, a personal data library 80, and a setting section 90.

Figure 2:
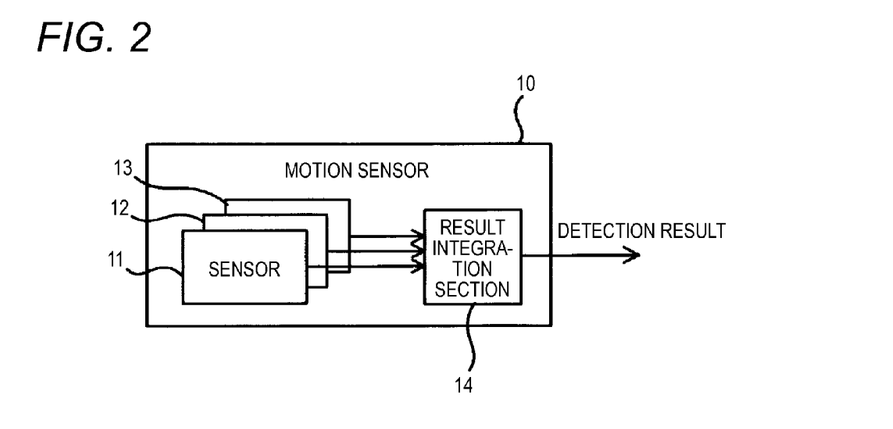
FIG. 2 is a block diagram illustrating a motion sensor.

As illustrated in FIG. 2, the motion sensor 10 integrates outputs of a plurality of different types of sensors such as a geomagnetic sensor 11, an acceleration sensor 12, and a gyro sensor 13 by a result integration section 14 and outputs a detection result. That is, the motion sensor 10 functions as a motion sensor that detects a motion of a user. For example, the result integration section 14 is constituted by a DSP (Digital Signal Processor) and the like. The detection result output from the motion sensor 10 is input into the motion determination section 20.

The motion sensor is also provided in the first slave device 110a, the second slave device 110b, and the third slave device 110c. Each of the first slave device 110a, the second slave device 110b, and the third slave device 110c includes a motion sensor 111 having a configuration similar to the motion sensor 10 provided in the host device 100 and a transmission section 112. For example, the transmission section 112 is constituted by a CPU (Central Processing Unit) and the like. Each detection result output from each of the motion sensors 111 of the first slave device 110a, the second slave device 110b, and the third slave device 110c is transmitted to the host device 100 by each of the transmission sections 112 of the first slave device 110a, the second slave device 110b, and the third slave device 110c.

The first slave device 110a, the second slave device 110b, and the third slave device 110c are connected to the host device 100 by wires or wirelessly, and each detection result transmitted from the first slave device 110a, the second slave device 110b, and the third slave device 110c is received by the receiving section 30 of the host device 100. For example, the receiving section 30 is constituted by a CPU and the like. The receiving section 30 outputs each received detection result to the motion determination section 20.

For example, the motion determination section 20 is constituted by a CPU and the like, and specifies and outputs one motion ID based on a result of each motion sensor output from the motion sensor 10 and the receiving section 30, motion information stored in the motion library 70, and personal data stored in the personal data library 80. That is, the motion determination section 20 functions as a motion determination section for determining identification information stored in the motion library from the detection result by the motion sensor and information indicating a content of the motion stored in the motion library.

Figure 3:
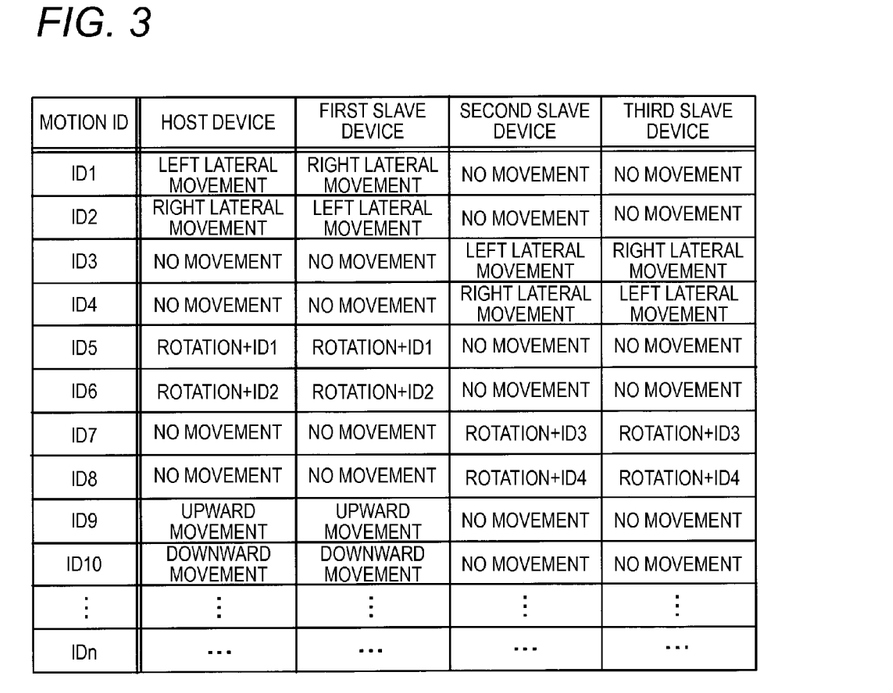
FIG. 3 is a diagram illustrating an example of motion information stored in a motion library.

The motion library 70 is a table constituted by motion information as illustrated in FIG. 3, and for example, is stored in a semiconductor memory or a memory card, and the like. The motion information is configured such that the motion ID is assigned one-to-one to a combination of the detection result of the motion sensor 10 of the host device 100 and the detection result of the motion sensor 111 of each of the first slave device 110a, the second slave device 110b, and the third slave device 110c. For example, the detection result of the motion sensor 10 of the host device 100 is "left lateral movement", the detection result of the motion sensor 111 of the first slave device 110a is "right lateral movement", and the detection result of the motion sensor 111 of the second slave device 110b and the third slave device 110c is "no movement", and "ID1" is assigned as the motion ID. The detection results of the motion sensor 10 and the motion sensor 111 are stored as movement modes and are also stored as a combination of a movement mode that is "rotation" and the motion ID of "ID1", for example, as a case of the motion ID of "ID5". That is, if the detection result of the motion sensor 10 of the host device 100 is "left lateral movement" corresponding to the motion ID of "ID1" and "rotation", the detection result of the motion sensor 111 of the first slave device 110a is "right lateral movement" corresponding to the motion ID of "ID1" and "rotation", the detection result of the motion sensor 111 of the second slave device 110b and the third slave device 110c is "no movement", "ID5" is assigned as the motion ID. The number and the content of the motion IDs stored in the motion library 70 are not interpreted as being fixed and may be appropriately changed. As described above, the motion library 70 functions as a table in which the motion information indicating the content of the motion and the identification information identifying the motion information are stored by being associated with each other. Furthermore, information ("left lateral movement" and the like) indicating the content of the motion for each predetermined amount of time configuring the entirety of motions is assigned to at least one of a plurality of portions (right hand, left hand, and the like) in which the motions are performed, for association as one set, and is stored in the motion library 70. The number (motion ID) of the identification is associated one-to-one with each set and is stored in the motion library 70.

Figure 4:
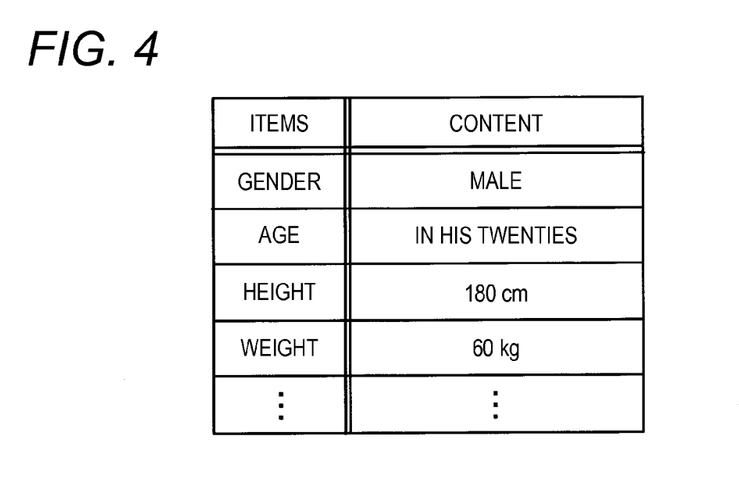
FIG. 4 is a diagram illustrating an example of personal data stored in a personal data library.

The personal data library 80 includes personal data as illustrated in FIG. 4, and for example, is stored in the semiconductor memory or the memory card, and the like. For example, the personal data includes information such as gender, age, height, and weight. The number of items and the content of the personal data are not interpreted as to be fixed and may be appropriately changed. As described above, the personal data library 80 functions as a personal data library storing the personal data.

For example, the setting section 90 is constituted by a CPU and the like, and is connected to the motion library 70 and the personal data library 80. The setting section 90 is connected to an external input device 200 such as a personal computer and reflects library data input by the external input device 200 on the motion library 70 and the personal data library 80. That is, if the motion information is input by the external input device 200, the setting section 90 reflects the motion information on the motion library 70. Furthermore, if the personal data is input by the external input device 200, the setting section 90 reflects the personal data on the personal data library 80. Moreover, if the setting section 90 is constituted by a touch panel and the like, the external input device 200 may be omitted.

For example, the audio watermark decoding section 40 is constituted by a DSP and the like, and decodes an audio watermark of inaudible bands superimposed on voice data. The audio watermark decoding section 40 is connected to a microphone 201. Playback sound of a video medium such as a DVD, television broadcast, and a video capable of being watched through a website on the Internet in which the sound is collected by the microphone 201 is input into the audio watermark decoding section 40. As an example of the video medium such as the DVD, for example, a DVD of a fitness system and the like, a DVD of a dance system and the like, a DVD for instruction of sports or music, and the like are included.

In the video medium such as the DVD, an information code which is obtained by code-converting is superimposed on the sound of the content to be originally recorded using the technique of the audio watermark. As the superimposed information code, for example, an information code which is obtained by code-converting of the motion ID as correct movement information and an information code which is obtained by code-converting of timing information of correct movement are included. However, the superimposed information code is not limited to the information codes and may be appropriately changed or added. As described above, the watermark information includes information (reference information) specifying the contents of the motion that is a reference and the timing information indicating a timing of the motion.

The audio watermark stored in the video medium such as the DVD is further described. The information code which is obtained by code-converting is modulated and is generated as a voice signal (modulation signal). As a modulation scheme, for example, it is possible to use various schemes such as spectrum spread modulation in which a pseudo noise signal of M-sequence and the like is phase-modulated by the information code, and a carrier signal is FSK-modulated or AM-modulated by the information code.

The sound of the contents and the modulation signal are added together and combined, and are recorded in the video medium such as the DVD as combined sound. It is possible to dispose a frequency band of the modulation signal in a high frequency band and it is possible to make a frequency spectrum not superimpose the sound of the content by appropriately selecting the modulation scheme, a carrier frequency, and the like. The sound of the content is disposed in an audible band, the modulation signal is disposed in a non-audible band, and these occupied frequency bands are separated, and thereby it is possible to improve reliability of information transfer by the modulation signal. Particularly, this is preferred if the modulation scheme that is weak in noise is used.

Moreover, when the sound of the content is not music but is sound which can be considered as a type of noise, the frequency band of the sound of the content may superimpose the frequency band of the modulation signal. In a case where the sound is considered as a type of noise, it is because an unpleasant feeling is not given to a listener specifically even if the modulation signal is superimposed.

The sound of the content received by the microphone 201 and the sound including the modulation signal are input into the audio watermark decoding section 40. The received sound is AD-converted to a digital signal, and then input into a demodulation section. For example, in the demodulation section, the demodulation is performed in a demodulation method corresponding to various modulation methods such as the spectrum spread modulation, in which the pseudo noise signal of M-sequence and the like is phase-modulated by the information code, and a carrier signal is FSK-modulated or AM-modulated by the information code. Since for example, as a specific modulation method and the demodulation method, a method disclosed in JP-A-2011-037350 may be used, and detailed description will be omitted. A demodulated information code is output from the demodulation section. Thus, it is possible to obtain the information code that is superimposed on the sound of the content to be originally recorded and stored in the video medium such as the DVD and the like. In a case of the embodiment, the information code corresponding to the motion ID and the information code corresponding to the timing information are included in the information code. As described above, the audio watermark decoding section 40 functions as a decoding section that decodes watermark information that is embedded in at least one of the video and the sound, and at least includes synchronization information (timing information).

For example, the timing motion determination section 50 is constituted by the CPU and the like. The timing motion determination section 50 registers the motion ID and the timing information output from the audio watermark decoding section 40 in the memory and the like, determines whether or not the motion of the user is the correct motion and whether the motion is performed at an appropriate timing, based on the motion ID and the timing information and the motion ID output from the motion determination section 20 in a predetermined timing, and outputs a result thereof. That is, the timing motion determination section 50 functions as a registration section that registers information specifying the content of the motion that is a reference and the timing information indicating the timing of the motion. Furthermore, the timing motion determination section 50 functions as a timing motion determination section that determines whether or not the motion reaches a timing indicated by the registered timing information based on the synchronization information (timing information), and if it is determined that the motion reaches the timing, determination regarding the motion is performed with reference to one type of information (motion ID) stored in at least the motion library and the information specifying the content of the motion that is the registered reference. Furthermore, the timing motion determination section 50 functions as a timing motion determination section that determines whether or not the motion reaches a timing indicated by the registered timing information based on the synchronization information (timing information), and if it is determined that the motion reaches the timing, determination is made regarding a relationship between the reference motion and the motion of the user as the detection result with reference to the determined identification information (motion ID) and the information specifying the content of the motion that is the registered reference.

For example, the feedback generation section 60 is constituted by the CPU and the like. The feedback generation section 60 converts the determination result output from the timing motion determination section 50 to feedback information. For example, if a voice such as "OK" is returned, the feedback generation section 60 may be constituted by a voice playback section or a voice combination section. Furthermore, if the feedback is returned with light, the feedback generation section 60 may be constituted by an LED controller. If the feedback is returned with vibration, the feedback generation section 60 may be constituted by a vibration section. Furthermore, as the feedback, when leaving a log, the feedback generation section 60 may be constituted by a recording section and a transmission section. As described above, the feedback generation section 60 functions as a notification section that performs notification based on the determination result.

Furthermore, as described above, the host device 100 functions as a host device at least including the decoding section, the registration section, the motion library, the motion determination section, the timing motion determination section, and the notification section. Furthermore, the first slave device 110a, the second slave device 110b, and the third slave device 110c function as a slave device at least including the motion sensor.

Figure 5:
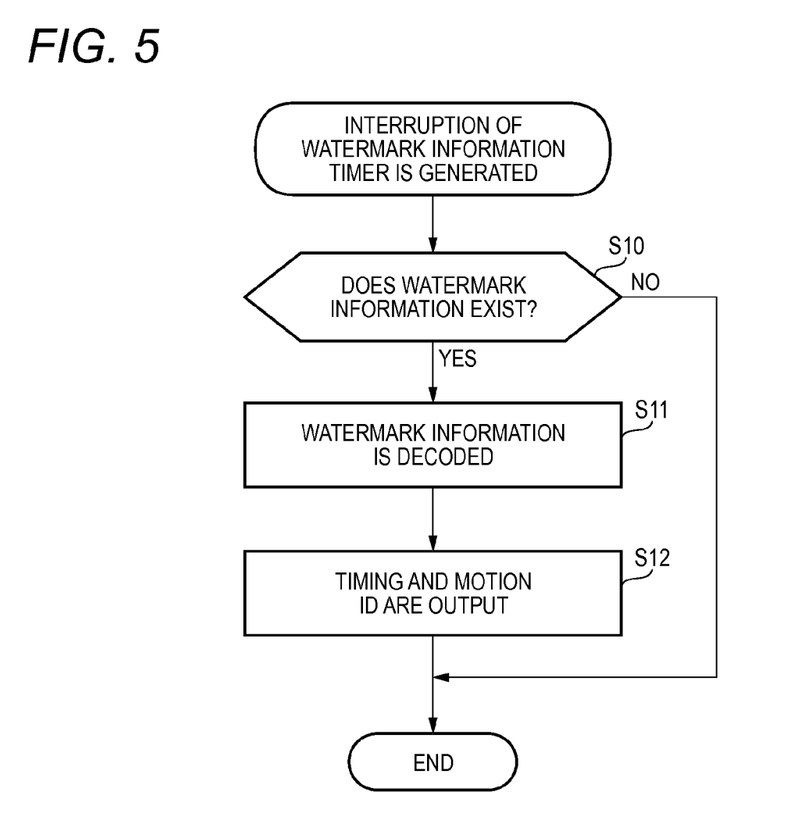
FIG. 5 is a flowchart illustrating an operation of an audio watermark decoding section.
Figure 6:
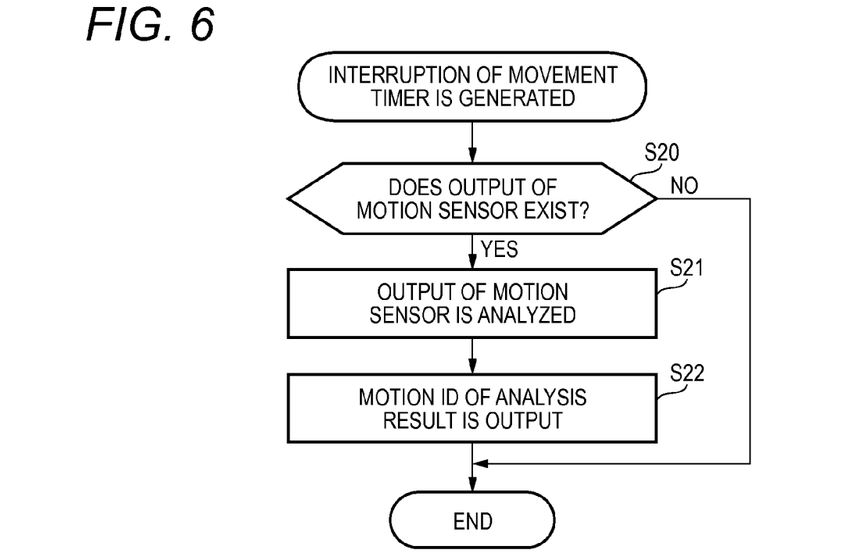
FIG. 6 is a flowchart illustrating an operation of a motion determination section.
Figure 7:
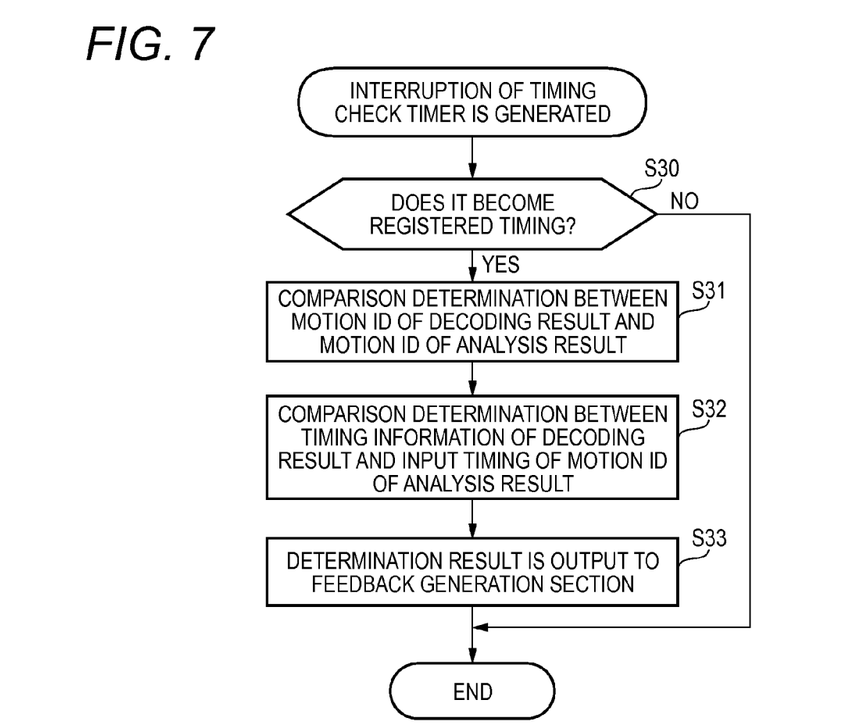
FIG. 7 is a flowchart illustrating an operation of a timing motion determination section.

Next, an operation of the motion notification system 1 of the embodiment will be described with reference to FIGS. 5 to 7. First, as illustrated in FIG. 5, the audio watermark decoding section 40 is configured such that interruption of the watermark information timer is generated for each predetermined period. The audio watermark decoding section 40 performs determination whether the watermark information (modulation signal) is superimposed on the input sound by generation of the interruption of the watermark information timer (step S10). For example, as a determination method, if the modulation signal is disposed in the inaudible bands, it may be determined whether or not the signal exists in the inaudible bands. The audio watermark decoding section 40 finishes the process if the watermark information is not superimposed (step S10: NO). Meanwhile, the audio watermark decoding section 40 performs the decoding of the watermark information by the method described above (step S11) if the watermark information is superimposed (step S10: YES) and the timing information obtained as a result of the decoding and the motion ID (reference information) are output (step S12). The timing information output from the audio watermark decoding section 40 and the motion ID are registered by a memory (recording section) (not illustrated) by the timing motion determination section 50. Moreover, in order to synchronize the timing information recorded on the video medium such as the DVD with an output timing of the motion ID from the motion determination section 20, for example, the timing information indicating a playback start of the video medium such as the DVD is recorded on the video medium such as the DVD as the audio watermark and when the timing information indicating the playback start output from the audio watermark decoding section 40 is input into the timing motion determination section 50, the timing motion determination section 50 starts measurement by a synchronous clock in the timing motion determination section 50. Then, when inputting the motion ID output from the motion determination section 20, the timing motion determination section 50 may store the time (time based on the number of synchronous clocks that is accumulated and counted from the measurement start) when the motion ID is input as the timing information together with the motion ID in the memory (recording section).

The motion determination section 20 is configured such that interruption of a movement timer is generated in a predetermined period in parallel with the operation of the audio watermark decoding section 40 and the timing motion determination section 50 described above. As illustrated in FIG. 6, if the interruption of the movement timer is generated, the motion determination section 20 determines whether or not there is an output of the motion sensor (step S20). In this case, the motion sensor includes both the motion sensor 10 provided in the host device 100 and the motion sensor 111 of each slave device. The motion determination section 20 finishes the process if there is no output of the motion sensor (step S20: NO). Meanwhile, if there is the output of the motion sensor (step S20: YES), the detection result output from the motion sensor is analyzed with reference to the motion information of the motion library 70 and the personal data of the personal data library 80 (step S21). Specifically, the motion determination section 20 determines the motion ID which is stored as the motion information of the motion library 70 and to which the content of the motion indicated by the detection result corresponds. In the determination, the motion determination section 20 performs correction of the determination criterion appropriately defined by the motion information as illustrated in FIG. 3 with reference to the personal data of the personal data library 80. That is, the motion determination section 20 can change the reference regarding whether or not the detection result output from the motion sensor satisfies the motion information depending on the content of the personal data. For example, if the content of the motion (motion information) corresponding to a certain motion ID is content of "jump by 30 cm", an actual detection result by the motion sensor does not reach 30 cm. In this case, if the detection result satisfies specific conditions such as an age of the personal data is an elderly age exceeding a predetermined age and the height of the personal data is lower than a predetermined height in the personal data library, it is possible to correct the determination criterion depending on the content of the personal data such as the determination criterion is changed from "jump by 30 cm" to "jump by 20 cm" or a criteria itself of "jump by 30 cm" is treated as invalid. That is, when performing the determination, the motion determination section 20 functions as a motion determination section for correcting the determination criterion with reference to the personal data stored in the personal data library. If the analysis described above is finished, the motion determination section 20 outputs the motion ID as a result thereof (step S22). If the motion ID is input from the motion determination section 20, the timing motion determination section 50 stores the motion ID together with the timing information indicating an input timing of the motion ID from the motion determination section 20 with reference to the synchronous clock described above in the memory.

The timing motion determination section 50 is configured such that interruption of a timing check timer is generated in a predetermined period in parallel with the operation of the motion determination section 20 and the timing motion determination section 50 described above. As illustrated in FIG. 7, if the interruption of the timing check timer is generated, the timing motion determination section 50 determines whether or not a current time (time point) reaches the timing indicated by the timing information output from the audio watermark decoding section 40 and registered in the memory with reference to the synchronous clock described above (step S30). If it is determined that the current time does not reach the timing indicated by the timing information (step S30: NO), the timing motion determination section 50 finishes the process. Meanwhile, if it is determined that the current time reaches the timing indicated by the timing information (step S30: YES), the timing motion determination section 50 determines whether or not the motion ID (the motion ID input from the audio watermark decoding section 40, that is, reference information) registered as the decoding result together with the timing information is matched to the motion ID (motion ID input from the motion determination section 20) of the analysis result (step S31). Furthermore, the timing motion determination section 50 compares the timing information of the decoding result registered together with the motion ID (reference information) of the decoding result to the input timing of the motion ID of the stored analysis result, and determines how far the input timing of the motion ID of the analysis result is shifted from the timing information of the decoding result (step S32). Then, the timing motion determination section 50 outputs the determination result of the motion ID and the determination result of the timing to the feedback generation section 60 (step S33). For example, the determination result may be output by being divided into stages such as if the motion ID matches and the shift of the timing is small, it is level 1, if the motion ID matches and the shift of the timing is large, it is level 2, and if the motion ID does not match, it is level 3. The feedback generation section 60 inputs the determination result and outputs the feedback as a signal of sound or light, and vibration such as the case of the level 1 is "VERY GOOD", the case of the level 2 is "GOOD", and the case of the level 3 is "NG". Thus, it is possible to notify the user of the information regarding the reference motion, which is difficult to understand only by watching the video/audio medium, by employing the sound or the light, the vibration, and the like in a type of a result of the comparison determination of the motion of the user to the reference motion.

Moreover, in the above description, an example in which the motion ID of the analysis result in the motion determination section 20 is determined by being compared to the timing information registered together with the timing input into the timing motion determination section 50 and the motion ID (reference information) of the decoding result (step S32) is described, but the present invention is not limited to such an example. For example, the process of step S32 is omitted, only matching of the motion ID is determined (step S31), and the determination result may be output.

As described above, according to the embodiment, the motion ID indicating the correct motion and the timing information are registered in the video/audio medium such as the DVD of fitness by the audio watermark, the information of the audio watermark is decoded from the playback sound of the video/audio medium, the detection results of the motion sensors of the host device and each slave device mounted on the body of the user are analyzed as the motion ID (analysis result) based on the motion library, the result of the match determination between the decoded motion ID (reference information) and the analyzed motion ID (analysis result) is fed back to the user. Thus, it is possible to notify the user of the information regarding the reference motion using a playback device of the video/audio medium such as a usual DVD or a television monitor, and it is possible to provide a more effective, not one-sided, and interactive system.

Furthermore, in the embodiment, since the information stored in the motion library 70 can be updated or replaced by the external input device 200, for example, even if the content recorded in the video/audio medium such as the DVD or the position on which the host device 100 or each of the slave devices 110a to 110c is mounted is changed, it is possible to easily respond to the change by updating or replacing the information stored in the motion library 70. Furthermore, even if a usage of a specific content is changed such as the content for the upper body training is used for the lower body training, it is possible to easily respond to the change only by changing the information stored in the motion library 70. That is, the motion ID stored in the content on the DVD is not changed and the information for the upper body training corresponding to the motion ID stored in the motion library 70 may be changed to the information for the lower body training. Thus, the contents to be played in the DVD are the same as each other, but it is also possible to be used as the content for the lower body training. Furthermore, it is also possible to open the update of the motion library 70 to the user and, in this case, the user can freely create a favorite library. Furthermore, it is also possible to share the motion library by Internet delivery and the like.

Second Embodiment

Next, a second embodiment of the present invention will be described with reference to FIG. 8. In the first embodiment, an example in which the host device 100 is mounted on the body of a user is described, but the second embodiment is an example in which a host device 100 is not mounted on the body of the user, a first slave device 110a, a second slave device 110b, and a third slave device 110c are mounted on the body of the user.

Figure 8:
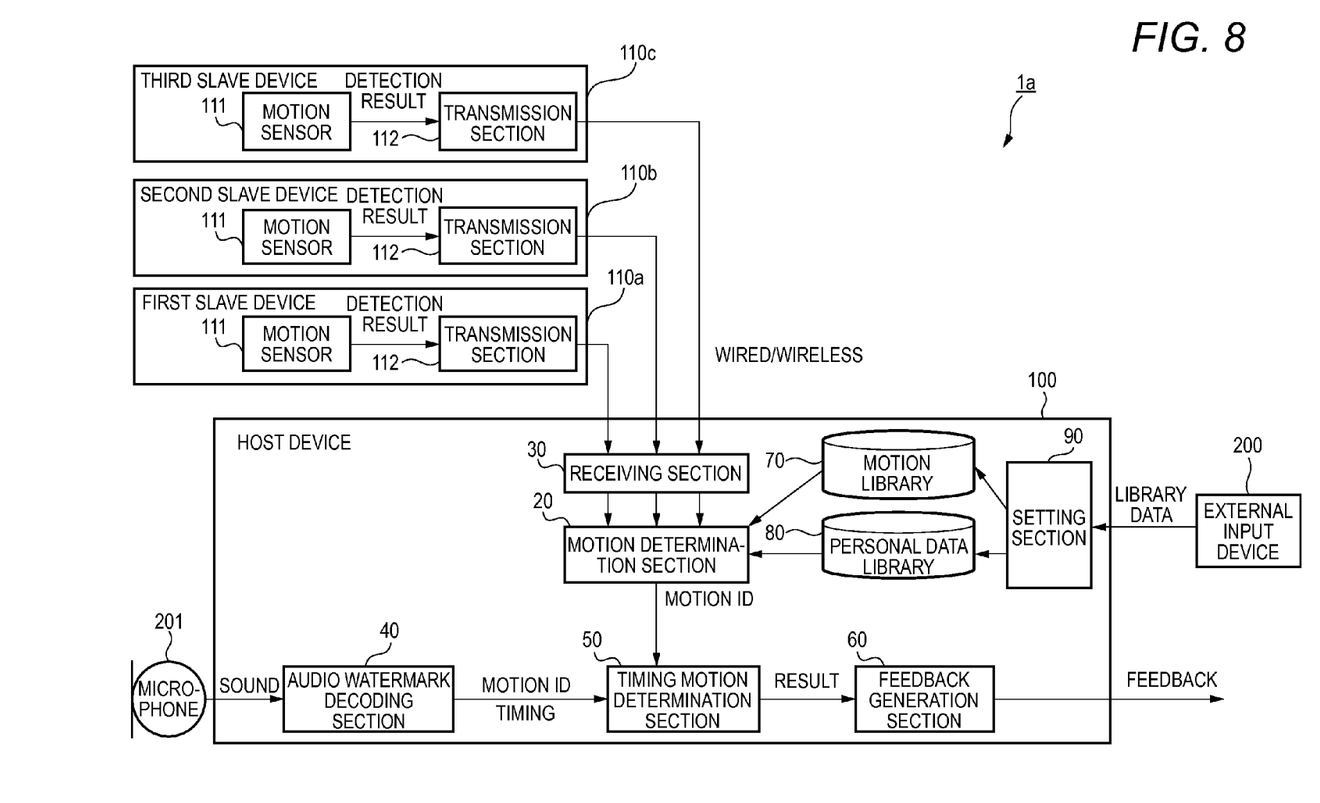
FIG. 8 is a block diagram illustrating a motion notification system according to a second embodiment of the present invention.

FIG. 8 illustrates a motion notification system 1a of the second embodiment. In the second embodiment, as illustrated in FIG. 8, a motion sensor is not provided in the host device 100. The second embodiment is similar to the first embodiment in that the number of the slave devices may be appropriately changed. Even in the configuration of the second embodiment, a detection result of a motion sensor of each slave device mounted on the body of the user is analyzed as a motion ID based on a motion library, feedback regarding a result of match detection between a decoded motion ID and the analyzed motion ID can be provided. Thus, it is possible to provide a more effective and not one-sided system using a playback device of a video/audio medium such as a usual DVD.

Third Embodiment

Next, a third embodiment of the present invention will be described with reference to FIG. 9. In each embodiment described above, an example in which the motion information is stored in the motion library 70 in advance is described, but the third embodiment is an example in which motion information is recorded in a video/audio medium such as a DVD as an audio watermark, playback sound of the video/audio medium such as the DVD is decoded, and then the motion information is stored in a motion library 70.

Figure 9:
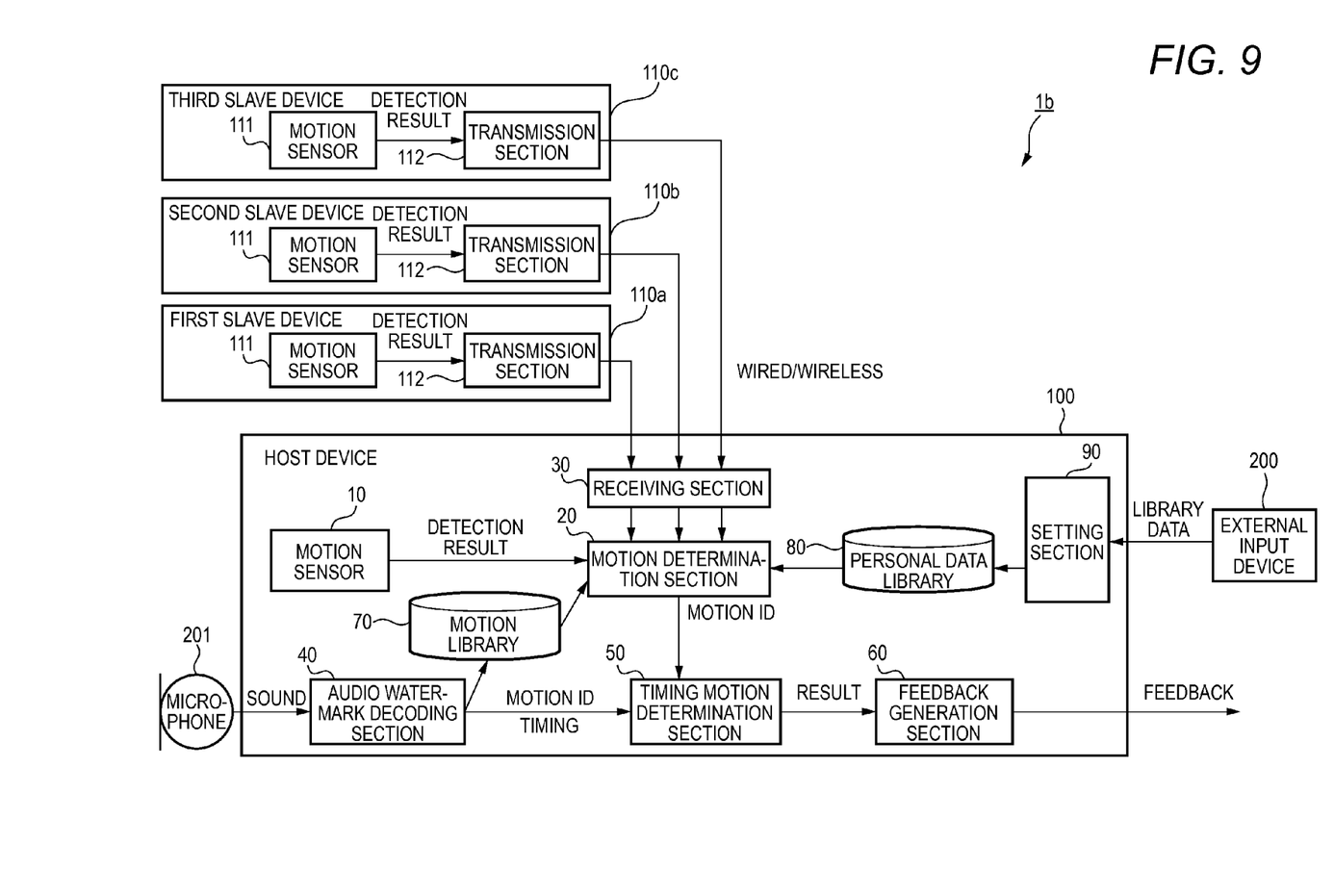
FIG. 9 is a block diagram illustrating a motion notification system according to a third embodiment of the present invention.

FIG. 9 illustrates a motion notification system 1b of the third embodiment. As illustrated in FIG. 9, in the third embodiment, access to the motion library 70 can be performed by an audio watermark decoding section 40. Motion information (specifically, the information illustrated in FIG. 3, that is, the motion ID and the information specifying the content of the reference motion) stored in the motion library 70 is, for example, superimposed on a portion of a title before a main story begins as an audio watermark. If playback of the video/audio medium such as the DVD is started and the portion of the title is played back, the audio watermark decoding section 40 decodes the motion information that is superimposed as the audio watermark and stores the motion information in the motion library 70. That is, the audio watermark decoding section 40 functions as a decoding section that stores decoded information specifying content of a motion that is a reference and identification information identifying the information in a motion library. Thereafter, the motion ID and the timing information are decoded and are output to a timing motion determination section 50 similar to the first embodiment. Furthermore, a motion determination section 20 outputs the motion ID with reference to the motion information of the motion library 70.

According to the third embodiment, since the motion information is also recorded in the video/audio medium such as the DVD as the audio watermark, it is possible to improve convenience without the need to manually update or change the motion library 70. Moreover, also in the third embodiment, a motion sensor 10 may be removed from the host device 100 as in the second embodiment.

Fourth Embodiment

Next, a fourth embodiment of the present invention will be described with reference to FIG. 10. In each embodiment described above, an example in which the result of the match determination between the motion ID of the analysis result and the motion ID of the decoding result, and the determination result of the timing are fed back is described, but in the fourth embodiment, a motion ID of an analysis result is also output.

Figure 10:
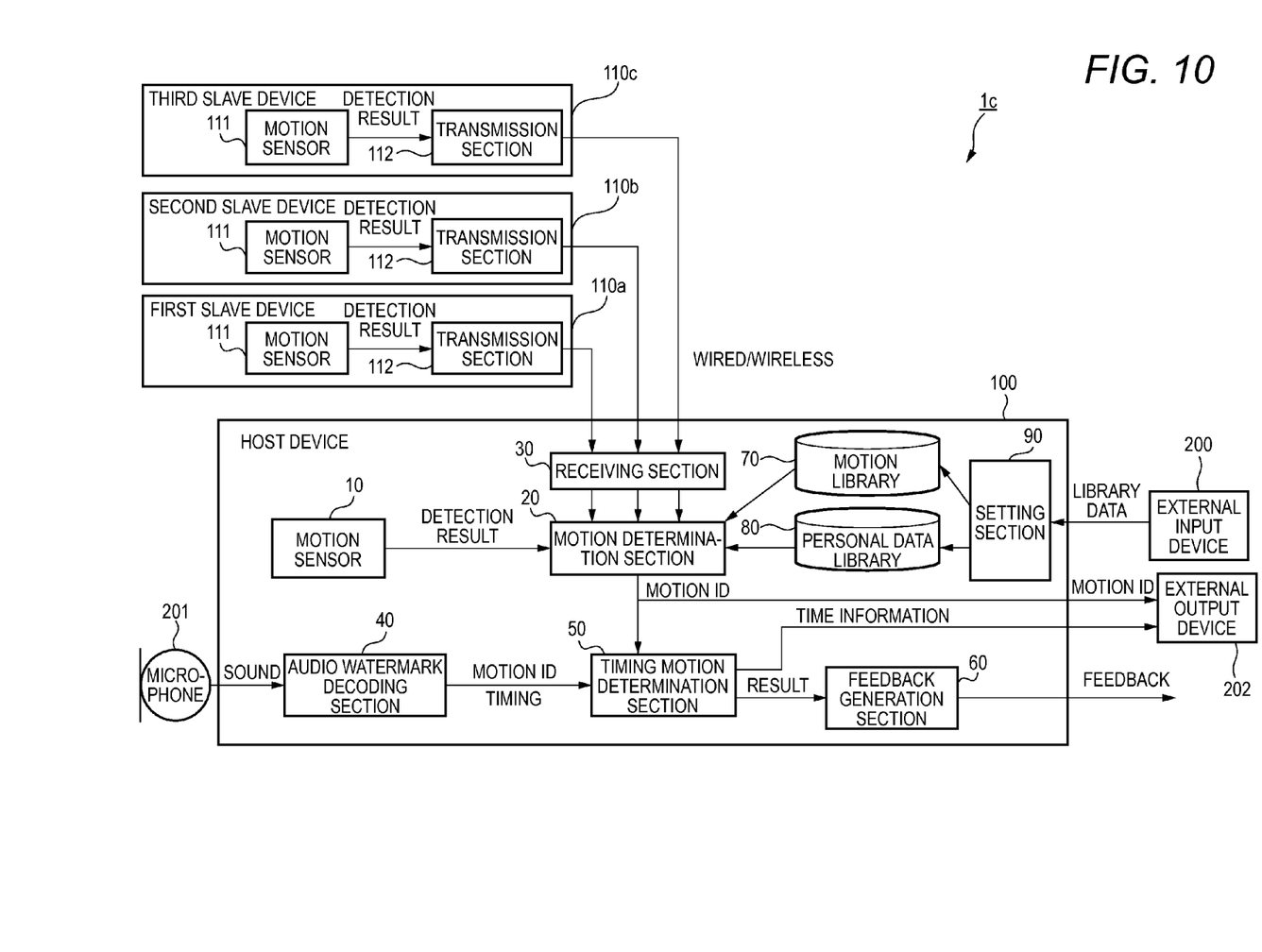
FIG. 10 is a block diagram illustrating a motion notification system according to a fourth embodiment of the present invention.

FIG. 10 illustrates a motion notification system 1c of the fourth embodiment. As illustrated in FIG. 10, in the fourth embodiment, an output of a motion determination section 20 is input into an external output device 202 such as a hard disk drive. In the fourth embodiment, if the motion ID of the analysis result is output from the motion determination section 20, the motion ID is input into both a timing motion determination section 50 and the external output device 202. The external output device 202 is configured to store the input motion ID together with timing information output by the timing motion determination section 50. Thus, according to the fourth embodiment, feedback can be performed with respect to the motion of the user and it is possible to accumulate the motion of the user as a log. Thus, it is possible to check how different the motion of the user is from a correct motion by analyzing a log. Furthermore, the motion ID is output to the outside and thereby it is possible to be used as a motion interface for outputting information depending on the motion of the user. Moreover, also in the fourth embodiment, a motion sensor 10 may be removed from a host device 100 as in the second embodiment. Furthermore, a motion library may be set as an audio watermark of a video/audio medium as in the third embodiment. Furthermore, the motion sensor 10 is removed from the host device 100 and the motion library may be set as the audio watermark of the video/audio medium as in the second and third embodiments.

Fifth Embodiment

Next, a fifth embodiment of the present invention will be described with reference to FIG. 11. In each embodiment described above, an example in which the motion and the sound of the video that is the model are recorded in the video/audio medium such as the DVD is described, but in the fifth embodiment, an example in which a motion ID corresponding to the model motion and an output section that outputs timing information are provided in a host device 100 is described.

Figure 11:
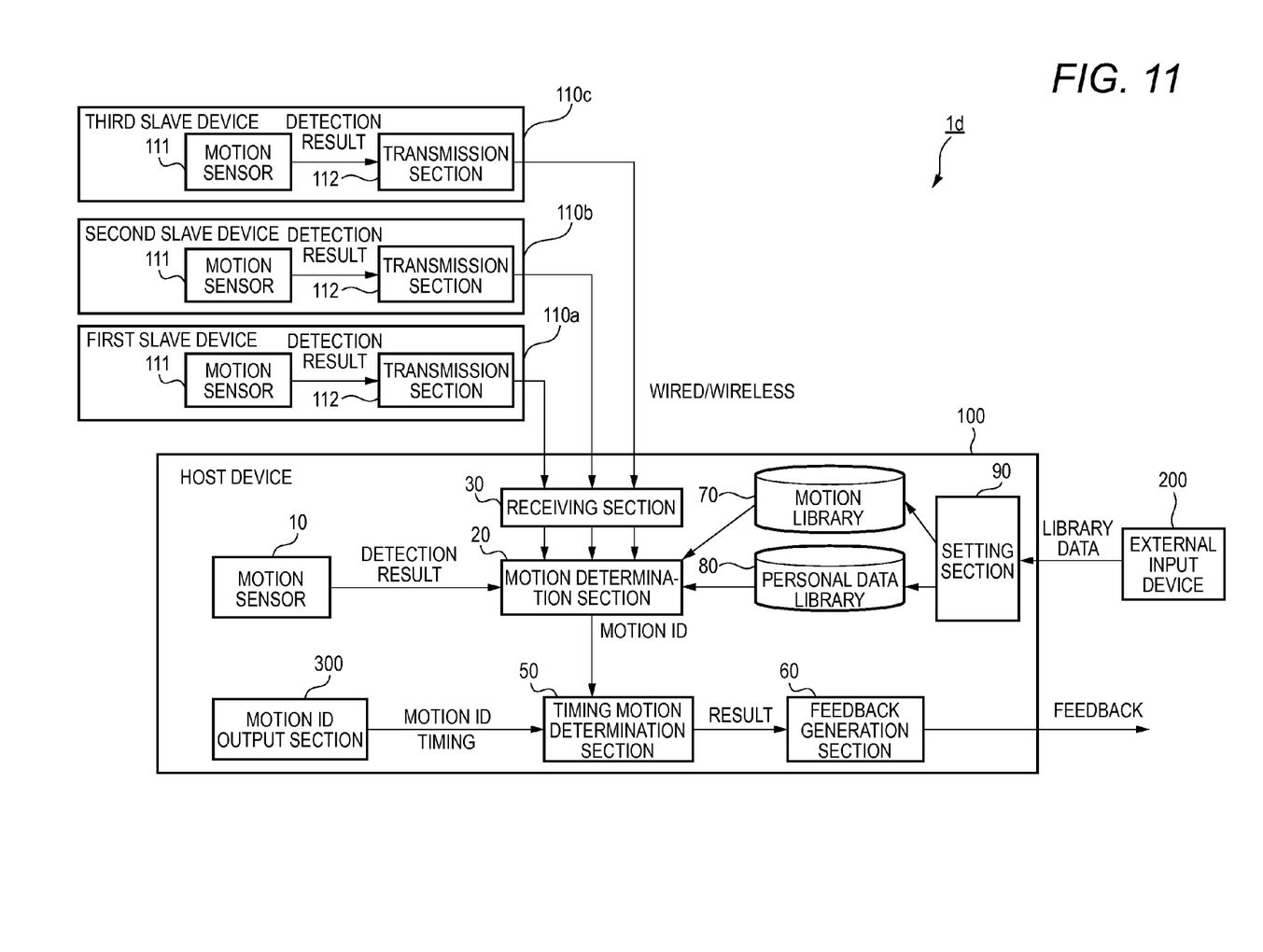
FIG. 11 is a block diagram illustrating a motion notification system according to a fifth embodiment of the present invention.

FIG. 11 illustrates a motion notification system 1d of the fifth embodiment. As illustrated in FIG. 11, the host device 100 includes a motion ID output section 300 that outputs the motion ID corresponding to the model motion and the timing information. The motion ID output section 300 may be configured such that not only the motion ID and the timing information are output but also, for example, sound or light indicating a tempo is output. According to such a configuration, it is possible to feed back a response of the user with respect to the sound or the light that is the model only by the motion notification system 1d without receiving playback sound of the video/audio medium such as the DVD. Moreover, also in the fifth embodiment, a motion sensor 10 may be removed from the host device 100 as in the second embodiment. Furthermore, the motion ID output section 300 and an external input device 200 or another external input device are configured to be capable of being connected to each other, and the motion ID and the timing information stored in the motion ID output section 300 may be rewritten.

Sixth Embodiment

Next, a sixth embodiment of the present invention will be described with reference to FIG. 12. In each embodiment described above, an example in which the motion of the user is analyzed using the motion sensor is described, but in the sixth embodiment, an example in which a notification information generation section notifies a user of a model motion without using a motion sensor is described.

Figure 12:
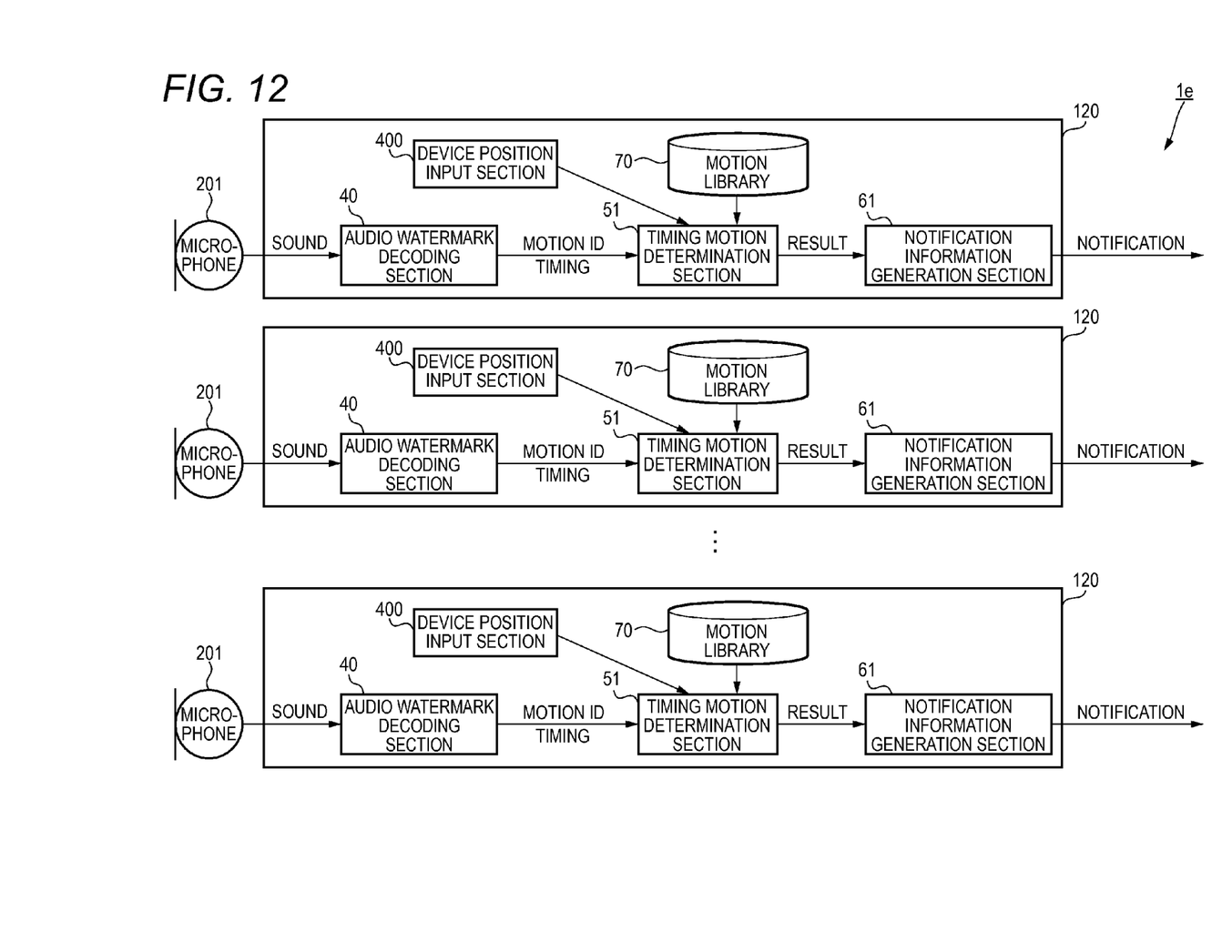
FIG. 12 is a block diagram illustrating a motion notification system according to a sixth embodiment of the present invention.

FIG. 12 illustrates a motion notification system 1e of the sixth embodiment. As illustrated in FIG. 12, the motion notification system 1e of the sixth embodiment includes a plurality of receiving devices 120. The receiving device 120 includes an audio watermark decoding section 40, a timing motion determination section 51, a notification information generation section 61, a motion library 70, and a device position input section 400.

The device position input section 400 has a function for inputting on which portion of the body of the user the receiving device 120 is mounted. In the sixth embodiment, for example, the receiving device 120 is mounted on both hands and both feet of the user and the user inputs the positions on which the receiving devices 120 are mounted as "right hand", "left hand", "right foot", and "left foot" using the device position input section 400. The device position input section 400 can be realized by a switch or a touch panel, and the like.

Similar to the audio watermark decoding section 40 in the host device 100 of each embodiment described above, the audio watermark decoding section 40 decodes an audio watermark included in a playback sound of the video/audio medium such as the DVD and outputs the motion ID and the timing information.

Similar to the timing motion determination section 50 in the host device 100 of each embodiment described above, the timing motion determination section 51 has a function for registering the motion ID and the timing information output from the audio watermark decoding section 40. However, as the timing motion determination section 50 in the host device 100 of each embodiment, a comparison determination of the motion ID of an analysis result is not performed. The timing motion determination section 51 of the embodiment refers to the motion information of the motion library 70 and when it becomes a registered timing, the content of the motion of the registered motion ID is read. If the content corresponds to a motion of a position that is input by the device position input section 400, a generation instruction signal of the feedback is output to the notification information generation section 61. For example, if the content of the motion of a certain motion ID includes content that is "right hand is moved to right side" and the position that is input by the device position input section 400 is "right hand", the generation instruction signal of the feedback signal is output to the notification information generation section 61.

The notification information generation section 61 has the same configuration as the feedback generation section 60 in the host device 100 of each embodiment described above. That is, for example, vibration is generated and thereby notification regarding the motion to the user is performed depending on the generation instruction signal output from the timing motion determination section 51. However, the notification information generation section 61 may be constituted by a voice playback section or a voice combination section, an LED controller, or a recording section and a transmission section.

If the receiving devices 120 of the motion notification system 1e of the sixth embodiment described above are mounted on both hands and both feet of the user, and for example, the video/audio medium such as the DVD of the fitness system is played back, the motion ID and the timing information recorded as the audio watermark are decoded and the receiving device 120 of a position to be moved vibrates at a timing indicated by the timing information. Thus, the user can know when to move which hand and which foot. As described above, according to the sixth embodiment, even if it is difficult to understand the motion only by watching the video/audio medium such as the DVD, it is possible to accurately inform the user of the portion to be moved and the timing.

Moreover, a plurality of receiving devices 120 are not always necessary and only one receiving device 120 may be used. Furthermore, one receiving device 120 may be used as the host device, the other receiving devices 120 may be used as the slave devices, and the generation instruction signal of the feedback may be transmitted by communication from the host device to the slave devices. Furthermore, the motion library 70 may be rewritten by the audio watermark as in the third embodiment.

MODIFIED EXAMPLES

The present invention is not limited to the embodiments described above and may be variously modified as follows. Furthermore, it is possible to appropriately combine the embodiments described above with each modified example.

(1) In each embodiment described above, an example in which the motion ID, the timing information, or the motion information is superimposed on the voice or sound of the original content using the audio watermark is described. However, the present invention is not limited to such an example and it is possible to use a video watermark. As the video watermark, for example, a method for indicating a difference in graduation to an extent that a viewer is unaware in the video is included. If the video watermark is employed, it is necessary to include a video watermark decoding section for decoding the video watermark from a playback video instead of the audio watermark decoding section.

(2) In each embodiment described above, an example in which the motion ID or the timing information are superimposed on the voice or sound of the original content using the audio watermark is described. However, the present invention is not limited to such an example and a correct timing information and a correct motion ID may be stored in a host device 100 or a receiving device 120, and only an appropriate synchronization timing may be included in the playback sound or a playback video of a video/audio medium such as a DVD using the audio watermark.

(3) In each embodiment described above, an example in which the motion ID or the timing information are included in the playback sound with the video of the video/audio medium such as the DVD is described. However, the present invention is not limited to such an example, and for example, a motion ID or timing information may be included in content of only voice or music as radio gymnastics. Otherwise, the motion ID or the timing information may be included in a content of only video without the voice or sound. Furthermore, inaudible sound in which an audio watermark is embedded may be played back together with a content of only video.

(4) In each embodiment described above, an example in which as the feedback, the vibration is used in addition to the sound or the light is described. However, the present invention is not limited to such an example and a feedback may be employed to provide some kind of award depending on accuracy of timing and motion or a size of the motion, and the like.

(5) In each embodiment described above, an example in which it is determined whether or not the correct motion can be performed by comparing the motion ID of the decoding result to the motion ID of the analysis result is described. However, the present invention is not limited to such an example and command information such as "right waist is pulled up" is recorded in a video/audio medium such as a DVD as an audio watermark or a video watermark and it may be determined whether or not the motion matches a movement indicated by the command information by the motion ID or a combination of the motion IDs of the analysis result. In this case, a relationship between the command information and the motion ID may be stored in a timing motion determination section 50 in advance.

(6) In each embodiment described above, an example in which the microphone is used as a tool for inputting information to the audio watermark decoding section 40 is described. However, the present invention is not limited to such an example. For example, if a video watermark is used, a camera or an optical sensor may be used.

(7) In each embodiment described above, an example in which the motion sensor is included in the host device or the slave device is described. However, the present invention is not limited to such an example. For example, an external motion sensor may be mounted on the host device or the slave device.

(8) In each embodiment described above, for a feedback, an example in which the sound or the light is output from the host device or the slave device, or the receiving device is vibrated is described. However, the present invention is not limited to such an example and an output of a feedback may be performed by connecting an external device such as a speaker or light to a host device, a slave device, or a receiving device.

What is claimed is:

1. A method for notifying a motion comprising:
   decoding watermark information superimposed on sound or video;
   outputting timing information obtained as a decoding result;
   analyzing a motion of a user with reference to a table;
   determining whether or not a predetermined timing comes based on the timing information;
   performing determination regarding the motion of the user based on an analysis result if it is determined that the predetermined timing comes; and
   performing notification based on a result of the determination.

2. The method according to claim 1, wherein the table stores at least motion information indicating motion content and identification information identifying the motion information, and
   the analysis result is the identification information output from the table.

3. The method according to claim 1, wherein the determination regarding the motion of the user is performed based on reference information indicating a reference motion and the analysis result.

4. The method according to claim 3, wherein the reference information is information obtained by decoding the watermark information superimposed on the sound or video.

5. The method according to claim 2, wherein the motion of the user is detected by a motion sensor provided on the user,
   the analyzing of the motion of the user is performed by outputting the identification information stored in the table based on a detection result by the motion sensor, and
   the determination regarding the motion of the user is performed based on reference information indicating a reference motion and the output identification information.

6. The method according to claim 5, wherein the decoding of the watermark information, the outputting of the timing information, the analyzing of the motion of the user, the determining of whether or not the predetermined timing comes, and the determination regarding the motion of the user are performed by a host device,
   the motion sensor is provided in a slave device, and
   the host device and the slave device are capable of communicating with each other.

7. The method according to claim 5, further comprising:
   correcting a determination criterion that is defined by the motion information in the table based on personal data stored in a personal data library, wherein
   the analyzing of the motion of the user is performed using the corrected determination criterion.

8. The method according to claim 1, wherein the watermark information is provided with reference information indicating a reference motion and identification information identifying the reference information, and
the method further comprises storing the reference information and the identification information obtained by the decoding result into the table.

9. The method according to claim 1, wherein the table associates the motion information of one or more portions constituting a motion to be executed at a certain timing with the identification information identifying the motion to be executed.

10. A method for notifying a motion comprising:
    analyzing a motion of a user with reference to a table, wherein the table associates motion information of one or more portions constituting a motion to be executed at a certain timing with identification information identifying the motion to be executed;
    referring to timing information indicating a timing of a reference motion and determining whether or not the timing comes;
    performing determination regarding the motion of the user based on the reference information specifying content of the reference motion and an analysis result if it is determined that the timing comes; and
    performing notification based on a result of the determination.

11. The method according to claim 10, wherein the motion of the user is detected by a motion sensor provided on the user,
    when analyzing the motion of the user, the identification information stored in the table is output based on a detection result by the motion sensor and the motion information stored in the table, and
    when performing the determination regarding the motion of the user, the determination regarding the motion of the user is performed based on the output identification information and the reference information.

12. The method according to claim 11, further comprising:
    correcting a determination criterion defined by the motion information in the table based on personal data stored in a personal data library, wherein
    the analyzing of the motion of the user is performed using the corrected determination criterion.

13. The method according to claim 12, further comprising:
    performing an update or replacement of the table or the personal data library.

14. An apparatus for notifying a motion comprising a processor configured to:
    decode watermark information superimposed on sound or video;
    output timing information obtained as a decoding result;
    analyze a motion of a user with reference to a table;
    determine whether or not a predetermined timing comes based on the timing information;
    perform determination regarding the motion of the user based on an analysis result if it is determined that the predetermined timing comes; and
    perform notification based on a result of the determination.

15. An apparatus for notifying a motion comprising:
    a table that associates motion information of one or more portions constituting a motion to be executed at a certain timing with identification information identifying the motion to be executed; and
    a processor configured to:
    analyze a motion of a user with reference to the table;

refer to timing information indicating a timing of a reference motion and determine whether or not the timing comes;

perform determination regarding the motion of the user based on reference information specifying content of the reference motion and an analysis result if it is determined that the timing comes; and perform notification based on a result of the determination.

* * * * *